United States Patent [19]

Weder et al.

[11] Patent Number: 5,575,746

[45] Date of Patent: *Nov. 19, 1996

[54] APPARATUS AND METHOD USING AIR PRESSURE AND VACUUM TO FORM FLAT-PANELED FLOWER POT COVER

[75] Inventors: Donald E. Weder; Joseph G. Straeter, both of Highland, Ill.

[73] Assignee: Southpac Trust International, Inc., Oklahoma City, Okla.

[ * ] Notice: The term of this patent shall not extend beyond the expiration date of Pat. No. 5,176,609.

[21] Appl. No.: 196,683

[22] Filed: Feb. 15, 1994

Related U.S. Application Data

[63] Continuation of Ser. No. 965,459, Oct. 23, 1992, Pat. No. 5,286,246, which is a continuation of Ser. No. 805,412, Dec. 10, 1991, Pat. No. 5,176,609, which is a continuation-in-part of Ser. No. 736,348, Jul. 26, 1991, Pat. No. 5,127,817, which is a continuation-in-part of Ser. No. 422,653, Oct. 17, 1989, Pat. No. 5,073,161, which is a continuation-in-part of Ser. No. 397,114, Aug. 22, 1989, Pat. No. 5,029,412, which is a continuation-in-part of Ser. No. 366,588, Jun. 15, 1989, Pat. No. 5,111,613, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 422,653, is a continuation-in-part of Ser. No. 367,098, Jun. 15, 1989, Pat. No. Des. 318,030, which is a continuation-in-part of Ser. No. 283,014, Dec. 8, 1988, abandoned, which is a continuation of Ser. No. 652,903, Sep. 21, 1984, abandoned, which is a continuation-in-part of Ser. No. 613,053, May 22, 1984, Pat. No. Des. 293,224, said Ser. No. 805,412, is a continuation-in-part of Ser. No. 710,272, Jun. 4, 1991, Pat. No. Des. 365,302, which is a continuation-in-part of Ser. No. 617,454, Nov. 21, 1990, abandoned, Ser. No. 411,249, Sep. 22, 1989, Pat. No. Des. 358,113, Ser. No. 411,247, Sep. 22, 1989, abandoned, and Ser. No. 411,245, Sep. 22, 1989, abandoned.

[51] Int. Cl.$^6$ ............................................. B31B 1/44
[52] U.S. Cl. ................ 493/154; 493/167; 425/387.1; 425/388
[58] Field of Search .................... 493/133, 134, 493/154, 167, 168, 170, 171, 174, 901, 135, 143, 153; 425/387.1, 388; 264/554

[56] References Cited

U.S. PATENT DOCUMENTS

| | | | |
|---|---|---|---|
| 1,814,546 | 7/1931 | Carson | 493/154 |
| 2,019,117 | 10/1935 | Conti | 493/154 |
| 2,898,822 | 8/1959 | Moore | 493/133 |
| 3,593,623 | 7/1971 | Oakley | 493/133 |
| 4,090,903 | 5/1978 | Matsui | 493/133 |

*Primary Examiner*—Jack W. Lavinder
*Attorney, Agent, or Firm*—Dunlap & Codding, P.C.

[57] ABSTRACT

A male die, a female die, air pressure and vacuum are used to form a sheet of material into a flat-paneled flower pot or flower pot cover. A platform supports the female die which has an opening with flat surfaces for forming panels in the base and skirt of the flower pot or flower pot cover. The male die has forming surfaces which mate with the forming surfaces of the female die. The sheet of material is centered over the opening of the female die. A bracket having a plurality of legs which align with the panel-forming surfaces of the female die is placed on the sheet of material. Air pressure and vacuum lines communicating with the opening of the female die are used to control the sheet of material as the male die enters the opening of the female die. The top surface of the platform and the bracket legs provide additional control of the sheet of material. The sheet of material is pressed between forming surfaces of the male and female die to form the flat-paneled flower pot or flower pot cover.

27 Claims, 5 Drawing Sheets

APPARATUS AND METHOD USING AIR PRESSURE AND VACUUM TO FORM FLAT-PANELED FLOWER POT COVER

CROSS-REFERENCE TO RELATED APPLICATIONS

This application is a continuation of U.S. Ser. No. 07/965,459, filed Oct. 23, 1992, entitled, "Apparatus and Method Using Air Pressure and Vacuum To Form Flat-Paneled Flower Pot Cover", now U.S. Pat. No. 5,286,246, issued Feb. 15, 1994; which is a continuation of U.S. Ser. No. 07/805,412, filed Dec. 10, 1991, entitled, "Apparatus and Method Using Air Pressure and Vacuum To Form Flat-Paneled Flower Pot Cover", now U.S. Pat. No. 5,176,609; which is a continuation-in-part of U.S. Ser. No. 07/736,348, filed Jul. 26, 1991, entitled, "Flat-Paneled Flower Pot or Flower Pot Cover Die", now U.S. Pat. No. 5,127,817, issued Jul. 5, 1992; which is a continuation-in-part of U.S. Ser. No. 07/422,653, filed Oct. 17, 1989, entitled, "Apparatus For Making Flower Pot or Flower Pot Cover With Controlled Pleats", now U.S. Pat. No. 5,073,161, issued Dec. 17, 1991; which is a continuation-in-part of U.S. Ser. No. 07/397,114, filed Aug. 22, 1989, entitled, "Flower Pot or Flower Pot Cover With Pleated Skirt And Or Base", now U.S. Pat. No. 5,029,412, issued Jul. 9, 1991; which is a continuation-in-part of U.S. Ser. No. 07/366,588, filed Jun. 15, 1989, entitled, "Pleated Flower Pot or Flower Pot Cover", now U.S. Pat. No. 5,111,613, issued May 12, 1992; which is a continuation-in-part of U.S. Ser. No. 07/219,083, Jul. 13, 1988, entitled, "Article Forming System", now U.S. Pat. No. 4,897,031, issued Jan. 30, 1990; which is a continuation of Ser. No. 07/004,275, filed Jan. 5, 1987, entitled, "Article Forming System", now U.S. Pat. No. 4,773,182, issued Sep. 27, 1988; which is a continuation of U.S. Ser. No. 06/613,080, filed May 22, 1984, entitled, "Article Forming System", now abandoned.

Said application Ser. No. 07/422,653 is also a continuation-in-part of design application U.S. Ser. No. 367,098, filed Jun. 15, 1989, entitled, "Flower Pot Cover", now U.S. Pat. No. D-318,030, issued Jul. 9, 1991; which is a continuation-in-part of design application U.S. Ser. No. 283,014, filed Dec. 8, 1988, entitled, "Flower Pot Cover", now abandoned; which is a continuation of design application U.S. Ser. No. 652,903, filed Sep. 21, 1984, entitled, "Flower Pot Cover", now abandoned; which is a continuation-in-part of design application U.S. Ser. No. 613,053, filed May 22, 1984, entitled, "Flower Pot Cover", now U.S. Pat. No. D-293,224, issued Dec. 15, 1987.

Said application Ser. No. 07/805,412 is also a continuation-in-part of design application U.S. Ser. No. 07/710,272, filed Jun. 4, 1991, entitled, "Flower Pot Cover", now U.S. Pat. No. D-365,302, issued Dec. 19, 1995; which is a continuation-in-part of design application U.S. Ser. No. 617,454, filed Nov. 21, 1990, entitled, "Flower Pot Cover", now abandoned.

Said design application U.S. Ser. No. 710,272 is also a continuation-in-part of design application U.S. Ser. No. 411,249, filed Sep. 22, 1989, entitled, "Flower Pot Cover", now U.S. Pat. No. D-358,113, issued May 9, 1995.

Said design application U.S. Ser. No. 710,272 is also a continuation-in-part of design application U.S. Ser. No. 411,247, filed Sep. 22, 1989, entitled, "Flower Pot Cover", now abandoned.

Said design application U.S. Ser. No. 710,272 is also a continuation-in-part of design application U.S. Ser. No. 411,245, filed Sep. 22, 1989, entitled, "Flower Pot Cover", now abandoned.

FIELD OF THE INVENTION

The present invention relates to a flower pot or a flower pot cover and, in particular, to a flower pot or flower pot cover having a flat-paneled base and skirt.

SUMMARY OF THE INVENTION

An article manufactured in accordance with the present invention comprises a flower pot or flower pot cover with a base, a skirt and an opening into which flowers or other decorative objects are inserted. The base and skirt are formed with a number of flat panels.

An apparatus constructed in accordance with the present invention comprises a male die, a female die and a bracket with legs for controlling a sheet of material disposed between the male die and the female die. Means are provided for moving the male die through the bracket and in and out of the female die. The female die has an opening defining a number of flat forming surfaces. The outer surface of the male die has forming surfaces which cooperate with the flat forming surfaces of the female die to form the flat panels in the sheet of material.

Although the flower pot or flower pot cover may be very decorative, such an article also serves the useful purpose of containing a flower pot or floral and decorative objects. Furthermore, the flower pot may hold soil for the potting of live flowers or artificial materials resembling soil or greenery for visual effect. Preferably constructed of waterproof material, the flower pot or flower pot cover may provide a non-leaking container of moisture needed to sustain living plants.

Additional advantages and features will become apparent from the detailed description of the preferred embodiments of the invention when read in conjunction with the drawings and appended claims.

DETAILED DESCRIPTION OF THE PREFERRED EMBODIMENTS

Figure 1:
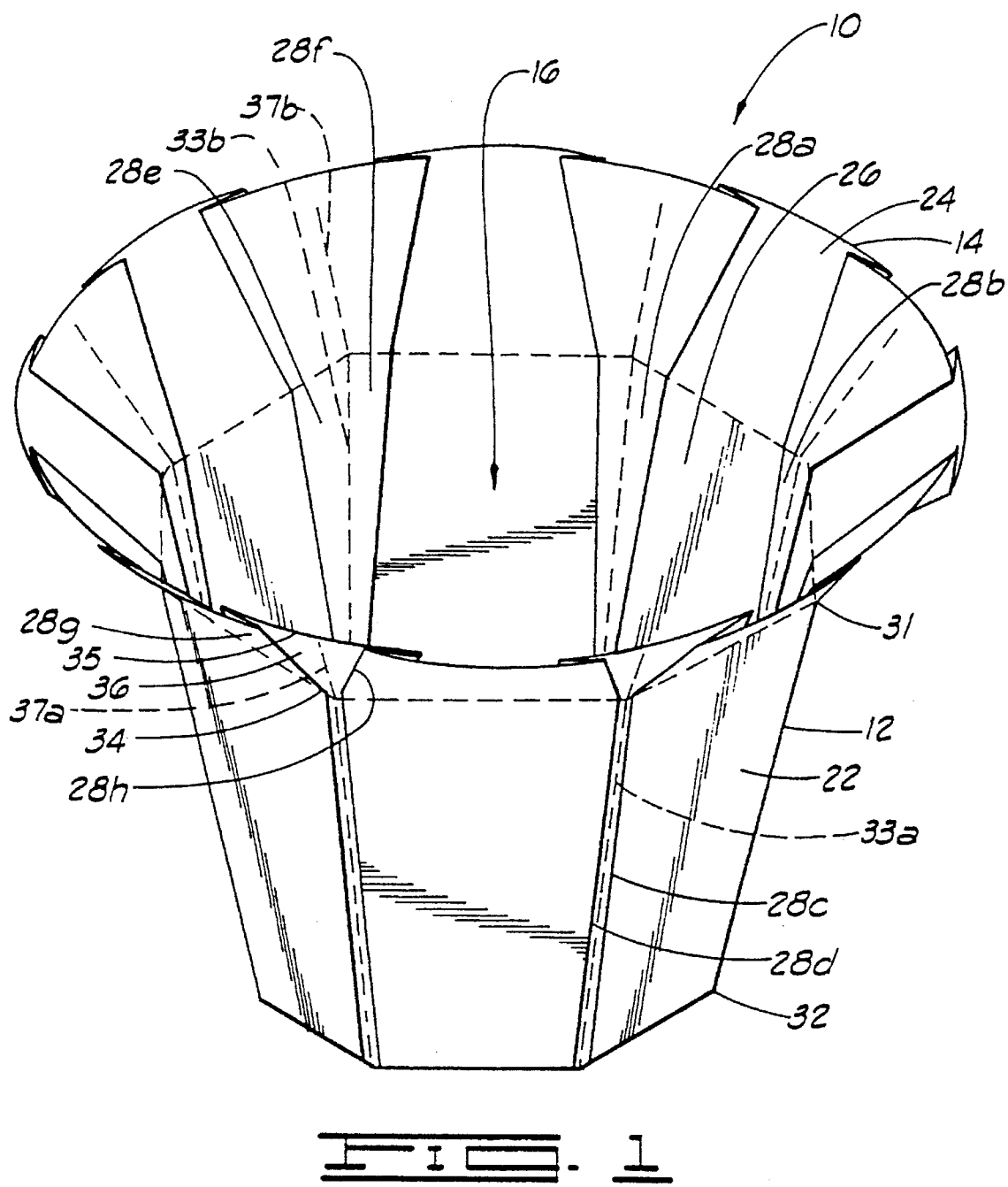
FIG. 1 is a perspective view of an article manufactured in accordance with the present invention. The edges of adjacent flat panels of the article are expanded slightly for the purpose of illustrating the folds and creases in the sheet of material.

Referring now to the drawings in general, and to FIG. 1 in particular, reference numeral 10 indicates a flower pot or flower pot cover manufactured in accordance with the present invention. The flower pot or flower pot cover 10 consists of a base 12, a skirt 14 and an opening 16 in which to place floral arrangements or a flower pot and other objects (not shown). The base 12 comprises a plurality of base flat panels and the skirt 14 comprises a plurality of skirt flat panels. One of the base flat panels is designated by reference numeral 22 and is representative of the plurality of base flat panels. One of the skirt flat panels is designated by reference numeral 24 and representative of the plurality of skirt flat panels.

The flower pot or flower pot cover 10 is shaped in part by an arrangement of a plurality of Z-shaped folds, some of which are represented by reference characters 28a through 28h. On the inside of the flower pot or flower pot cover 10, each flat panel 22 of the base 12 consists of a single thickness of material 26 between two non-adjacent Z-shaped folds 28a and 28b. The Z-shaped folds 28a of the base 12 are widest at a top 31 of the base 12 and uniformly diminish to virtually no fold at all at a bottom 32 of the base 12.

At the outside of the flower pot or flower pot cover 10, adjacent Z-shaped folds 28c and 28d abut each other continuously from the top 31 of the base 12 to the bottom 32 of the base 12. (FIG. 1 shows the Z-shaped folds 28c and 28d to be separated slightly for purposes of illustration. It will be appreciated that, in actual construction, the Z-shaped folds 28c and 28d are essentially in contact with one another in the base 12 of the flower pot or flower pot cover 10.) The abutment of the adjacent Z-shaped folds 28c and 28d forms the intersecting edge between two adjacent flat panels 22 of the base 12. The only folds in the outer periphery of the base 12 abut at the intersecting edges of adjacent flat panels 22. The outside surface of each flat panel 22 of the base 12, therefore, has no folds other than the abutting folds at the edges and is essentially flat.

Turning again to the inside of the flower pot or flower pot cover 10, the Z-shaped folds of the base 12, represented by reference characters 28e and 28f, form a "V" with the point of the "V" at the bottom 32 of the base 12. Half of each "V" is located in each adjacent flat panel 22 inside the opening 16. A plurality of creases (indicated by dashed lines) are formed in the base 12 and each crease bisects one of the V's to form the intersecting edge of adjacent flat panels 22 of the base 12 inside the opening 16. Reference character 33a indicates a crease representative of the plurality of creases in the base 12 on the outside of the flower pot cover 10. Reference character 33b indicates a crease representative of the plurality of creases in the base 12 on the inside of the flower pot cover 10.

The construction of the base 12 described hereinabove results in the opening 16 gradually growing larger from the bottom 32 of the base 12 to the top 31 of the base 12. It will be appreciated that the Z-shaped folds 28a–28f of the base 12 are pressed flat to make each panel 22 of the base 12 substantially two-dimensional in shape.

Continuing to refer to FIG. 1, the skirt 14 is a modified extension of the Z-shaped folds which form the base 12. At a bottom 34 of the skirt 14, for example, two Z-shaped folds 28g and 28h abut each other. Progressing from the bottom 34 of the skirt 14 to a top 35 of the skirt 14, however, the two Z shaped folds 28g and 28h increasingly separate from one another. This increasing separation of the two Z-shaped folds 28g and 28h results in a single thickness of material 36 at the intersection of two adjacent skirt flat panels 24. Each single thickness of material 36 has a crease to form the intersecting edge of two adjacent skirt flat panels 24. The crease designated by reference character 37a is representative of the outside skirt creases. The crease designated by reference character 37b is representative of the inside skirt creases.

The construction described hereinabove allows the skirt 14 to extend angularly in an upward and outward direction from the base 12. It will be appreciated that the Z-shaped folds 28g and 28h of the skirt 14 are pressed flat to make each skirt panel 24 substantially two-dimensional in shape.

When the article is constructed to be used as a flower pot, the opening 16 is sized and shaped to receive a floral grouping and soil. The floral grouping may be cut fresh flowers, artificial flowers and various secondary plants and ornamentation. When the article is designed to be used as a flower pot cover, the opening 16 is adapted to receive a flower pot and the flower pot cover 10 provides a decorative exterior for the flower pot.

Figure 2:
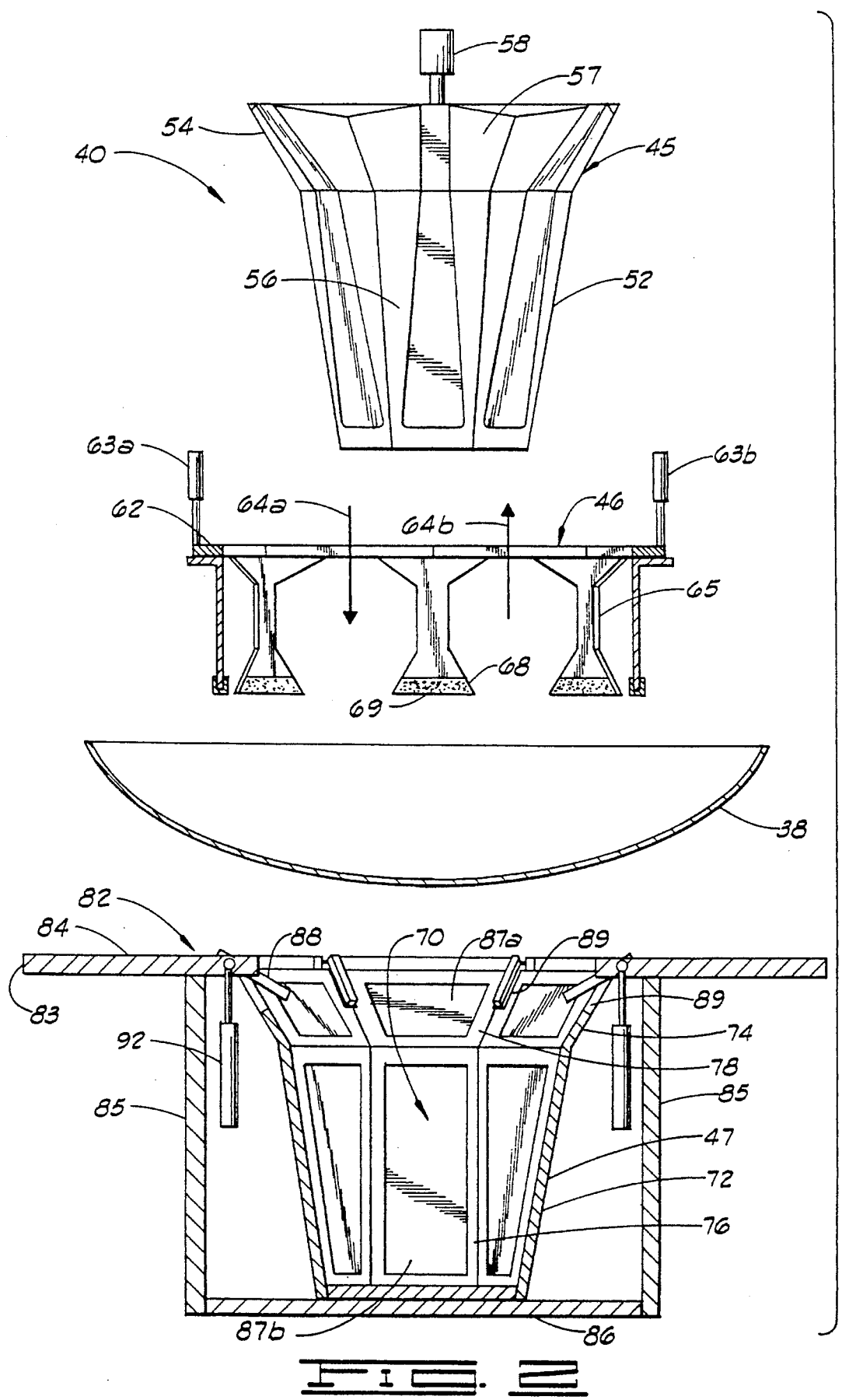
FIG. 2 is an exploded elevational view of an apparatus constructed in accordance with the present invention. Cross-sectional views of the bracket, sheet of material and female die are shown. The thickness of the sheet of material is exaggerated for purposes of illustration.

Turning now to FIG. 2, the flower pot or flower pot cover 10 is formed from a sheet of material 38 having a relatively small thickness, preferably less than 3 mils. Depending upon the type of material selected, however, the sheet of material 38 may have a thickness ranging from about 1.5 mils to about 30 mils. The sheet of material 38 is composed of substances selected from the group of materials consisting of cellophane, man-made organic polymer films, metallic foil, burlap, fabric, paper, or combinations thereof. The term "man-made organic polymer film" means a man-made resin such as a polypropylene as opposed to naturally occurring resins such as cellophane.

As shown in FIG. 2, an apparatus 40 for forming the flower pot or flower pot cover 10 from the sheet of material 38 includes a male die 45, a bracket 46 and a female die 47. The male die 45 comprises a generally frusto-conical base 52 with a skirt 54 extending upwardly and angularly from the base 52. The base 52 and skirt 54 are formed with a plurality of sides corresponding to the number of panels to be formed in the flower pot or flower pot cover 10. The reference characters 56 and 57 indicate one of the sides of the base 52 and skirt 54, respectively, of the male die 45. The sides 56 and 57 are representative of the plurality of sides forming the skirt 54 and base 52 of the male die 45. The sides 56 and 57 of the male die 45 together comprise the male forming surface of the male die 45.

A pneumatic cylinder 58 or other driving force is connected to the male die 45 and is used to move the male die 45. The male die 45 is moved between a resting position, in which the male die 45 is positioned a distance from the bracket 46 and female die 47, and a forming position, in which the male die 45 is positioned within the female die 47. The pneumatic cylinder 58 is connected to a support assembly (not shown). The support assembly and the pneumatic cylinder 58 cooperate to support the male die 45.

The bracket 46 consists of a ring-like frame 62 with an opening (indicated by direction arrows 64a and 64b) therethrough. A plurality of pneumatic cylinders, representatively designated by reference characters 63a and 63b, are attached to the bracket 46 for movement of the bracket 46 to and from the female die 47. The pneumatic cylinders 63a and 63b of the bracket 46 are connected to a support assembly (not shown) which cooperates with the pneumatic cylinders 63a and 63b to support the bracket 46.

The opening of the bracket 46 is sized and shaped to allow the male die 45 to pass through the bracket 46. A plurality of bracket legs extend downward from the frame 62. One of the bracket legs is indicated by reference numeral 65 and is representative of the plurality of legs extending from the bracket 46. The number of bracket legs 65 corresponds to the number and location of panels to be formed in the flower pot or flower pot cover 10. The lower end 68 and lower edge 69 of each bracket leg 65 is adapted to keep the sheet of material 38 flat and unwrinkled as the sheet of material 38 enters the female die 47.

Continuing to refer to FIG. 2, the female die 47 forms an opening 70 which has a generally frusto-conical base 72 and a skirt 74 extending upwardly and angularly from the base 72. The opening 70 is essentially a female forming surface comprising a plurality of base flat panels and skirt flat panels. One of the base flat panels is indicated by reference number 76 and one of the skirt flat panels is indicated by reference number 78. Base panel 76 and skirt panel 78 are representative of the base and skirt panels comprising the female forming surface for the base 12 and skirt 14 of the flower pot cover 10. The base panels 76 and skirt panels 78 comprise the female forming surfaces of the female die 47.

Reference number 82 indicates generally the female die 47 mounted in a platform 83. The platform 83 provides a flat upper work surface 84 around the upper end of the female die 47. The female die 47 and the upper surface 84 are supported by a plurality of sides 85 and a bottom 86 of the platform 83.

A plurality of cartridge type heating elements (not shown) may be connected to the male die 45. Each of the heating elements is disposed in a cylinder in an inner portion of the male die 45 and the heating elements are positioned about the male die 45 to heat the outer surfaces of the base 52 and skirt 54 of the male die 45 to a predetermined temperature level during the flat panel forming process. Each of the heating elements is connected to an electrical power supply (not shown).

A plurality of cartridge type heating elements (not shown) may be connected to the female die 47. The heating elements are positioned about the female die surface and connected to an electrical power supply (not shown) for heating the female die surface to a predetermined temperature level during the flat panel forming process.

As best illustrated by FIG. 2, the female die 47 preferably has a plurality of inserts of syntactic foam, or other heat-insulating material, applied to the inner areas of the flat forming surfaces 76 and 78. The insert of syntactic foam indicated by reference character 87a is representative of the inserts of syntactic foam applied to the skirt panels 76. The insert of syntactic foam indicated by reference character 87b is representative of the inserts of syntactic foam applied to the base panels 78. The inserts of syntactic foam or other heat-insulating material prevent too much heat from reaching portions of the sheet of material 38. Heat is required primarily at areas where folds and creases are formed in the sheet of material 38, and too much heat at other areas of the sheet of material 38 may cause undesirable wrinkles in the flower pot or flower pot cover 10.

Figure 3:
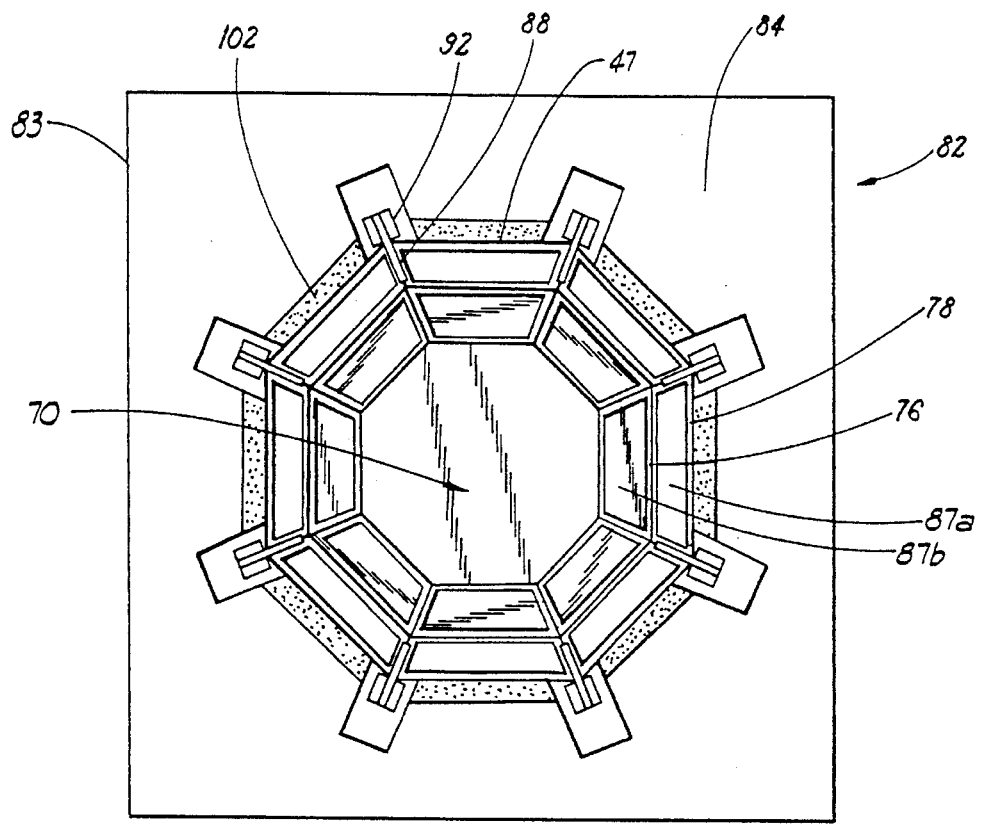
FIG. 3 is a top plan view of a female die constructed in accordance with the present invention.
Figure 4:
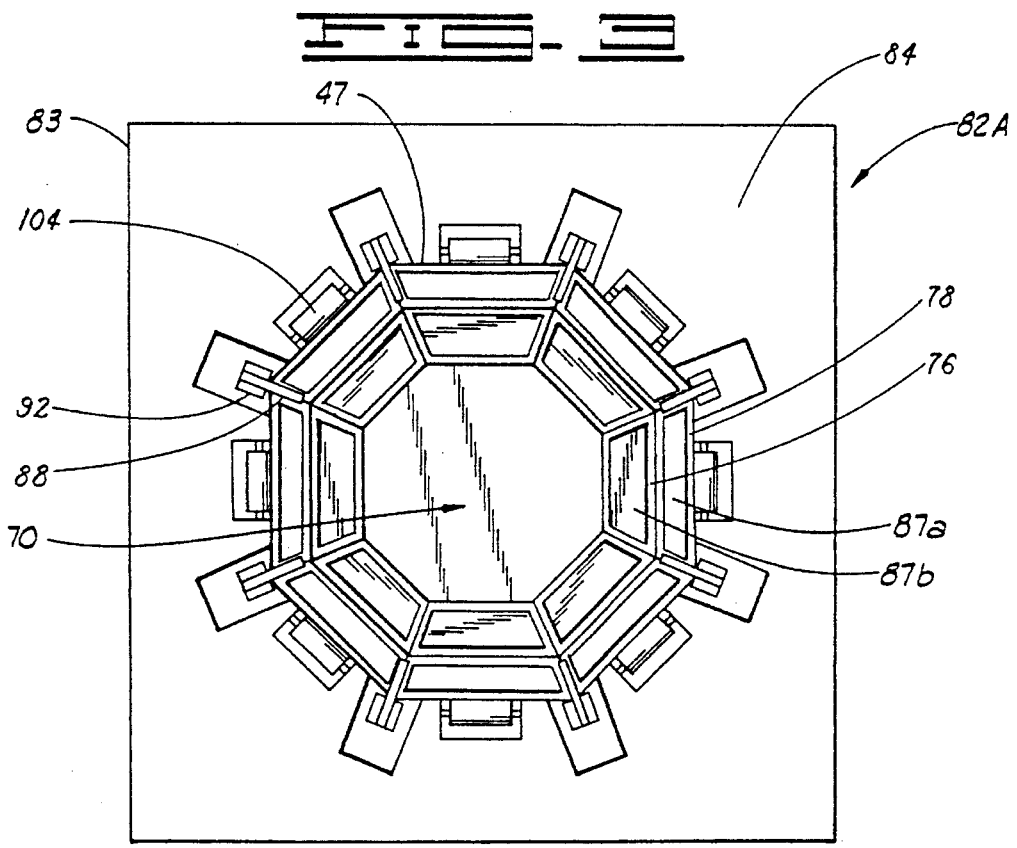
FIG. 4 is a top plan view of another form of a female die constructed in accordance with the present invention.

As illustrated by FIGS. 2 through 4, the female die 47 has a plurality of fingers. One of the fingers is indicated by reference numeral 88 and is representative of the fingers of the female die 47. One of the fingers 88 is positioned at the upper end of each juncture between two adjacent skirt flat panels 78 of the female die 47. A recess, corresponding to each finger 88, is formed in the skirt-forming area of the female die 47. One of the recesses is indicated by reference numeral 89 in FIG. 2. Each recess 89 is sized and shaped to receive the corresponding finger 88 completely.

The fingers 88 are adapted to pivot between a position pointing across the opening 70 of the female die 47 to a position wherein the fingers 88 are completely contained within the corresponding recess 89. When pivoted into its corresponding recess 89, each finger 88 forms a relatively even surface with the two adjacent skirt-forming panels 78. A pneumatic cylinder 92 or comparable device is used to pivot each of the fingers 88.

FIGS. 3 and 4 show a top plan view of the female die 47 mounted in a platform 83 with a table-like top surface 84 around the female die 47. As described above, the opening 70 of the female die 47 has base forming surfaces 76 for forming the flat panels of the base 12 and skirt forming surfaces 78 for forming the flat panels of the skirt 14. FIG. 3 illustrates a plurality of areas of protective material, such as felt, applied to the top surface 84 of the platform 83 along the upper end of the skirt forming surfaces 78 of the female die 47. One of the areas of the protective material is indicated by the reference numeral 102 and is representative of the plurality of areas of protective material applied to the top surface 84 of the platform 83. The protective material 102 prevents abrasion or other damage to the sheet of material 38 as the sheet of material 38 is pushed into the opening 70 of the female die 47. FIG. 4 shows another embodiment 82A of the platform mounted female die 47 wherein a plurality of rollers are mounted to the platform 83 along the upper end of the skirt forming surfaces 78 of the female die 47. One of the rollers is indicated by reference numeral 104 and is representative of the plurality of rollers. The rollers 104 enhance the ease with which the sheet of material 38 may be pushed into the opening 70 of the female die 47.

Figure 5:
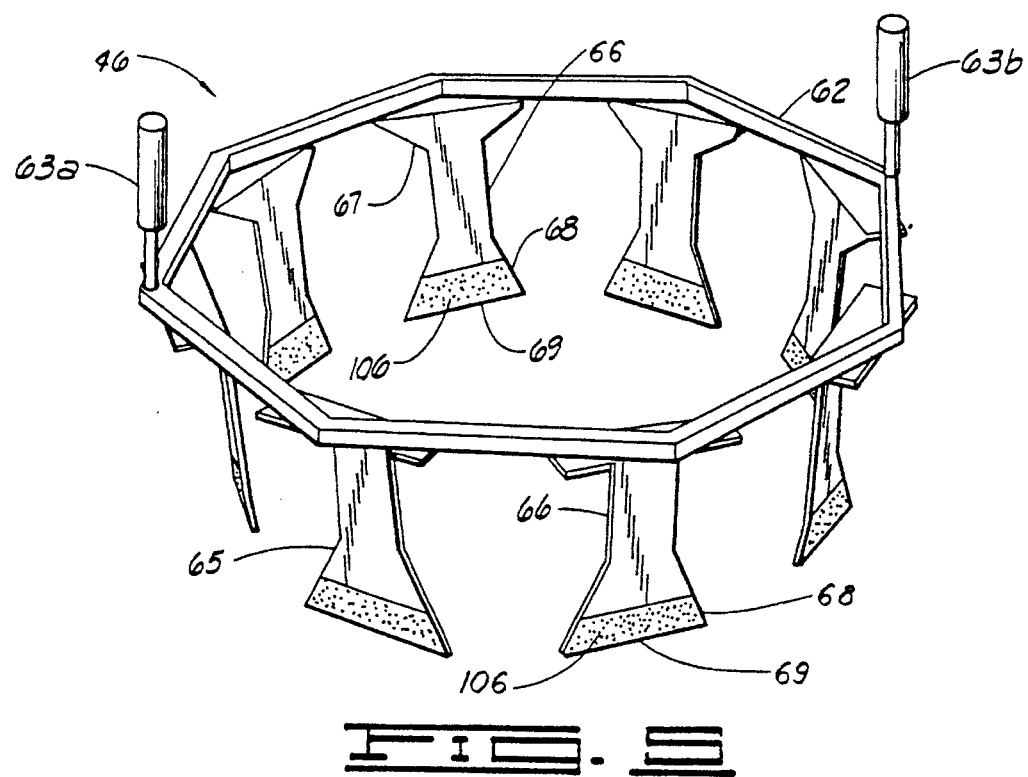
FIG. 5 is a perspective view of the bracket shown in FIG. 2.

Turning to FIG. 5, the construction of the bracket 46 is now described in detail. The ring-like frame 62 supports a plurality of legs which extend in a downward direction from the frame 62. One of the legs is indicated by reference number 65 and is representative of the plurality of legs extending from the bracket 46. The medial portion 66 of the legs 65 is more narrow than the top 67 and bottom 68 portions of the legs 65. The wide upper portion 67 of the legs 65 allows a firm attachment to the frame 62. The wide lower portion 68 of the legs 65 covers a substantial part of the width of each flat panel at the top of the skirt 14 to control the sheet of material 38 during the forming process.

As shown in FIG. 5, the lower portion 68 and lower edge 69 of each bracket leg 65 is preferably covered by a protective material 106, such as felt. The protective material 106 keeps the bracket legs 65 from scratching or otherwise damaging the sheet of material 38 as the sheet of material 38 passes underneath the lower edge 69 of the bracket legs 65.

Figures 6, 7:
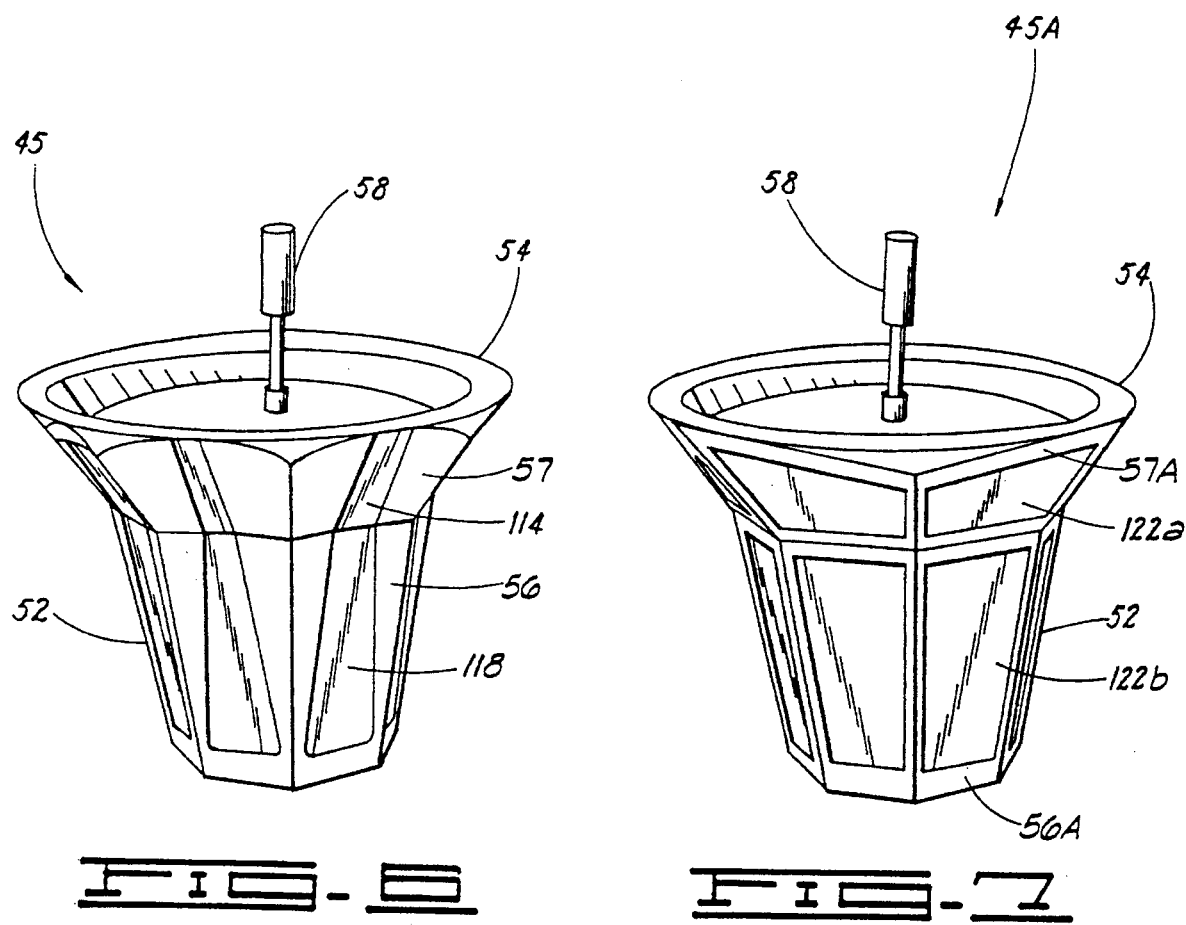
FIG. 6 is a perspective view of the male die shown in FIG. 2.
FIG. 7 is a perspective view of another form of a male die constructed in accordance with the present invention.

Referring to FIG. 6, a male die 45 constructed in accordance with the present invention is now described. The male die 45 is generally the size and shape of the flower pot or flower pot cover 10 to be formed. As described hereinabove, the male die 45 comprises the base 52 formed by the sides 56 and the skirt 54 formed by the sides 57. The sides 57 of the skirt 54 are not flat, but curve inwardly. A recessed area 114 is formed in the surface of each side 57 of the male die skirt 54. Similarly, a recessed area 118 is formed in the surface of each side 56 of the male die base 52. The purpose of the recessed areas 114 and 118 is to dissipate heat in the areas where folds and creases are not being formed in the sheet of material 38. As disclosed hereinabove, excessive heat may cause undesirable wrinkles in the flower pot or flower pot cover 10.

Referring to FIG. 7, another form of a male die constructed in accordance with the present invention is disclosed. Reference character 45A designates a male die wherein the sides or forming surfaces 57A and 56A of the base 52 and skirt 54 are flat. In this embodiment, heat is dissipated by the application of a heat-insulating material, such as syntactic foam, to the flat forming surfaces 57A and 56A of the male die 45A. One of the areas of syntactic foam is indicated by reference character 122a and is representative of the heat-insulating material applied to each of the skirt panels 57A. Another of the areas of syntactic foam is indicated by reference character 122b and is representative of the heat-insulating material applied to each of the base panels 56A.

Figure 8:
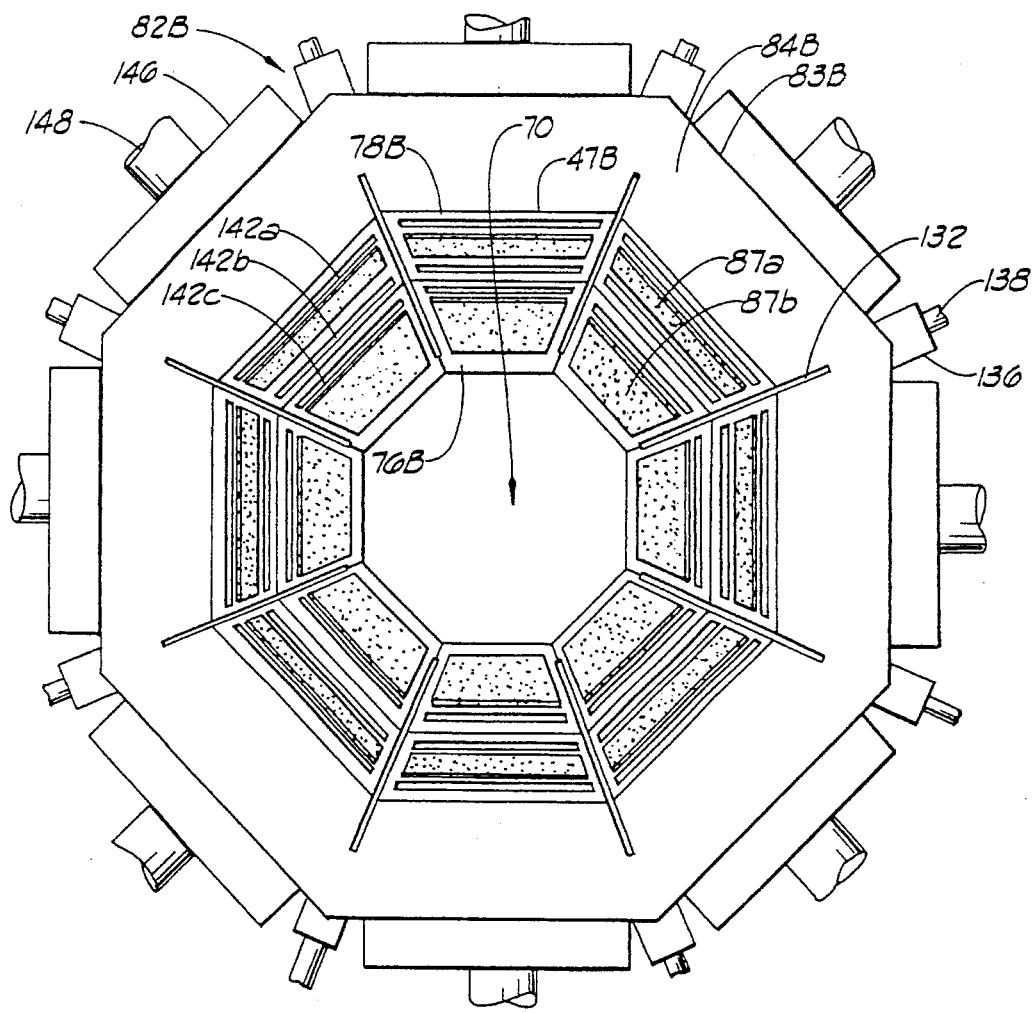
FIG. 8 is a top plan view of another form of a female die constructed in accordance with the present invention.
Figure 9:
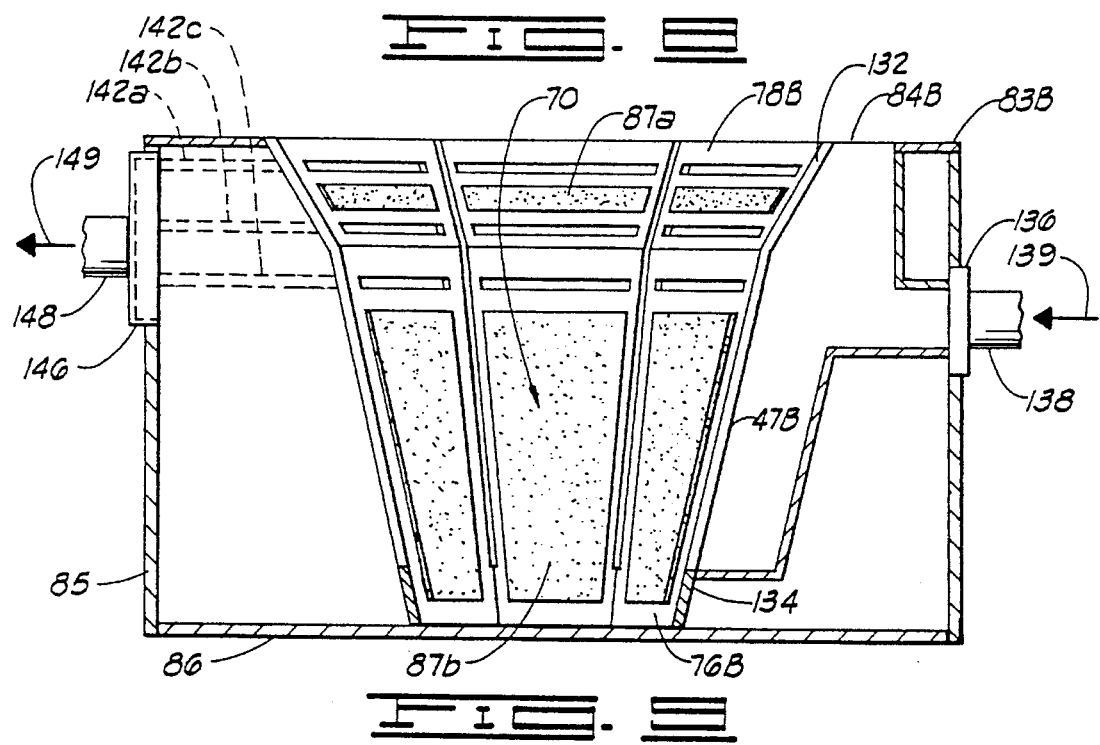
FIG. 9 is a side elevational, partial sectional, partial diagrammatic view of the female die of FIG. 8.

Referring now to FIGS. 8 and 9, reference character 82B designates another form of a female die and platform constructed in accordance with the present invention. An elongated slot communicates with the opening 70 of the female die 47B along the intersection of each pair of adjacent skirt-forming surfaces 78 and along the intersection of each pair of adjacent base-forming surfaces 76. One of the elongated slots, designated by reference numeral 132, is generally representative of all the elongated slots. As best shown in FIG. 9, each elongated slot 132 extends from a lower portion 134 of the female die 47B to the upper surface 84B of the platform 83B. Each elongated slot 132 is connected to an air pressure manifold 136 and conduit 138 providing a blast of air in the direction of arrow 139 from a switchable air pressure source (not shown).

Each skirt forming surface 78B has a medial portion covered with syntactic foam 87a. Similarly, syntactic foam 87b covers a medial portion of each base forming surface 76B. The purpose of the syntactic foam 87a and 87b is to absorb heat and prevent heat-wrinkles in the sheet of material 38 when heat-sealable material is used with a heated male die 45.

Continuing to refer to FIGS. 8 and 9, each skirt and base forming surface 78B and 76B of the female die 47B has a plurality of elongated vacuum slots 142 communicating with the opening of the female die 70. Three of the vacuum slots, designated by reference characters 142a, 142b and 142c, are generally representative of the plurality of vacuum slots. Each vacuum slot 142 extends laterally over a medial portion of each female forming surface 76B and 78B. As best shown in FIG. 9, the vacuum slots 142 are preferably arranged with one vacuum slot 142a in an upper portion of each skirt forming surface 78B, one vacuum slot 142b in a lower portion of each skirt forming surface 78B and one vacuum slot 142c in an upper portion of each base forming surface 76B. Each vacuum slot 142a, 142b and 144c is connected to a switchable vacuum source (not shown) through a vacuum manifold 146 and vacuum source conduit 148. The vacuum applied to the vacuum slots 142a–142b–142c is indicated by direction arrow 149 in FIG. 9.

In order to prevent unwanted wrinkles or scratches in the sheet of material 38, a protective material such as felt may be attached to the top surface 84B of the platform 83B around the opening 70 of the female die 47B as illustrated by the felt 102 in FIG. 3 and as described hereinabove. Furthermore, a plurality of rollers may be positioned in the top surface 84B of the platform 83B around the opening 70 of the female die 47B to facilitate the movement of the sheet of material 38 into the opening 70 of the female die 47B. This arrangement of rollers 104 is shown in FIG. 4 and is described hereinabove.

In operation, a flower pot or flower pot cover 10 is formed as described hereinafter. The male die 45 and the bracket 46 are initially positioned at a distance from the female die 47, in the resting position. The fingers 88 of the female die 47 are positioned to point across the opening 70 of the female die 47. The sheet of material 38 is centrally placed over the opening 70 of the female die 47.

The bracket 46 is then moved onto over the sheet of material 38 with the lower edge 69 of the bracket legs 65 aligned with the upper panel edges of the opening 70 of the female die 47. The sheet of material 38 is disposed between the lower edge 69 of the bracket legs 65 and the top surface 84 of the platform 83 surrounding the female die 47.

The shape of the bracket legs 65 is instrumental in the formation of the flat panels in the sheet of material 38. As the sheet of material 38 is pushed into the opening 70 of the female die 47, the sheet of material 38 is forced to fold over itself along the angular lower portion 68 of each side of each bracket leg 65. The sheet of material 38 takes the shape of a flattened "U" fold around the lower portion 68 of each bracket leg 65. As the male die 45 is moved into forming position with the opening 70 of the female die 47, a plurality of flat panels is formed with each flat panel disposed between two of the flattened U-shaped folds.

With the sheet of material 38 under frictional control between the bracket legs 65 and platform upper surface 84, the male die 45 is moved through the bracket 46 and into the female die 47 until the male forming surfaces 57 and 56 press the sheet of material 38 against the female forming surfaces 76 and 78. As the male die 45 is moved into the female die 47, the fingers 88 of the female die 47 are pushed by the male die 45 to pivot toward the recesses 89. During this movement, the fingers 88 hold the sheet of material 38 against the male die 45 at the intersections of the panels to be formed. By this action, the fingers 88 help control the sheet of material 38 and assist in making uniform folds in the sheet of material 38. Without the fingers 88, the folds in the sheet of material 38 are not formed in substantially the same size and shape and the flower pot or flower pot cover 10 is not formed to be substantially symmetrical.

If the male die 45 is allowed to push the fingers 88 all the way into their corresponding recesses 89, wrinkles can be formed in the sheet of material 38 by pinching the sheet of material 38 between fingers 88 and the finger recesses 89. To eliminate this problem, a limit switch (not shown) detects when the male die 45 is within approximately one-half inch of being completely in the forming position with the opening 70 of the female die 47. When the male die 45 reaches this point, the limit switch actuates the pneumatic cylinders 92 to pivot the fingers 89 to be completely contained by the finger recesses 89.

Finally the full forming position is reached, wherein the male die 45 is completely within the opening 70 of the female die 47. The sheet of material 38 is pressed between the female base forming surfaces 76 of the female die 47 and the male base forming surfaces 56 of the male die 45 to form the base 12 of the flower pot or flower pot cover 10. The sheet of material 38 is pressed between the female skirt forming surfaces 78 of the female die 47 and the male skirt forming surfaces 57 of the male die 45 to form the skirt 14 of the flower pot or flower pot cover 10. The pressing of the sheet of material 38 between the forming surfaces 56 and 57 of the male die 45 and the forming surfaces 76 and 78 of the female die 47 creases the folds in the sheet of material 38 to form the shape of a flat-paneled flower pot or flower pot cover 10.

The sheet of material 38 may be treated to be self-adhesive, and the sides of the folds in the sheet of material 38 adhere to one another to attain a more permanent shape. The sheet of material 38 may also be heat-sealant, and heat applied to the male die 45 or the female die 47 effects a heat-seal of the folds, also to achieve a more permanent shape for the flower pot cover 10.

After the sheet of material 38 is formed into the shape of a flat-paneled flower pot or flower pot cover 10, the pneumatic cylinder 58 acts to remove the male die 45 from the female die 47. A limit switch (not shown) detects when the male die is out of the opening 70 of the female die 47 and actuates the pneumatic cylinders 92 to pivot the fingers 88 back out of their corresponding recesses 89 to extend across the opening 70 of the female die 47. The male die 45 and the bracket 46 are returned to the resting position. The flower pot or flower pot cover 10 is removed from the female die 47, and the process is repeated.

The operation of the male die 45 with the female die 47B is similar to that just described. The female die 47B, however, utilizes air pressure and vacuum, instead of the fingers 88, to control the sheet of material 38 as the male die 45 is moved into the opening 70 of the female die 47B. The limit switch operates in response to the position of the male die 45 to activate and de-activate the air pressure and vacuum. When the male die 45 is partially within the opening 70 of the female die 47B, the limit switch activates the air pressure and vacuum. A jet of air rushes from each elongated slot 132 to push the sheet of material 38 toward the male die 45 along the length of each elongated slot 132. The vacuum from each vacuum slot 142 draws the sheet of material 38 toward the female die 47B along the length of each vacuum slot 142. The pushing and pulling action starts the folds in the correct locations of the sheet of material 38 and helps control the material as it is formed into the shape of the flat-paneled flower pot or flower pot cover 10. When the male die 45 reaches the full forming position, the limit switch senses the position of the male die 45 and de-activates the vacuum and air pressure.

Changes may be made in the combinations, operations and arrangements of the various parts and elements described herein without departing from the spirit and scope of the invention as defined in the following claims.

What is claimed is:

1. An apparatus for forming a sheet of material into a flower pot or flower pot cover, the apparatus comprising:
   a female die having an upper end, a lower end, and an opening with at least three forming surfaces;
   a male die having an upper end, a lower end, and at least three mating surfaces, each mating surface corresponding to one of the forming surfaces of the female die;
   means for moving at least one of the male die and the female die back and forth between a resting position wherein the male die is spaced a distance from the female die and a forming position wherein the male die is disposed in the opening of the female die;
   air pressure means for introducing a blast of air into the opening of the female die; and
   vacuum means for producing a vacuum at at least one of the forming surfaces of the female die;
   wherein each forming surface of the female die cooperates with the corresponding mating surface of the male die to form the sheet of material into a flower pot or flower pot cover when the male die is disposed in the opening of the female die.

2. The apparatus of claim 1 wherein each mating surface of the male die has at least one recessed area.

3. The apparatus fo claim 1 wherein each mating surface of the male die is flat.

4. The apparatus of claim 1 wherein a heat-insulating material is applied upon each mating surface of the male die.

5. The apparatus of claim 4 wherein the heat-insulating material comprises syntactic foam.

6. The apparatus of claim 1 wherein the forming surfaces of the female die are flat.

7. The apparatus of claim 1 wherein the sheet of material is treated to be self-adhering.

8. The apparatus of claim 1 wherein the sheet of material is treated to be heat-sealing.

9. The apparatus of claim 1 wherein a heat-insulating material is applied upon the forming surfaces of the female die.

10. The apparatus of claim 9 wherein the heat-insulating material comprises syntactic foam.

11. The apparatus of claim 1 wherein the air pressure means further comprises an air pressure conduit extending to the opening of the female die at each intersection of laterally adjacent forming surfaces of the female die.

12. The apparatus of claim 11 wherein each air pressure conduit introduces the blast of air into the opening of the female die through an elongated slot extending along each intersection of laterally adjacent forming surfaces of the female die, each elongated slot communicating with the opening of the female die.

13. The apparatus of claim 12 wherein each elongated slot extends substantially from the upper end of the female die to the lower end of the female die.

14. The apparatus of claim 1 wherein the vacuum means further comprises:
    a plurality of vacuum lines communicating with the opening of the female die at a medial portion of each forming surface of the female die;
    wherein each vacuum line communicates with the opening of the female die through a vacuum slot to draw a portion of the sheet of material toward the corresponding forming surface of the female die as the male die is moved into the opening of the female die.

15. The apparatus of claim 14 wherein each vacuum slot is elongated.

16. The apparatus of claim 15 wherein each vacuum slot extends in a lateral direction on the corresponding forming surface of the female die.

17. The apparatus of claim 1 further comprising:
    a platform having a plurality of sides, a top surface and a bottom, the top surface surrounding the upper end of the female die; wherein the female die is supported by the platform.

18. The apparatus of claim 17 wherein a protective material is applied to the top surface of the platform substantially around the opening of the female die at the upper end of the female die.

19. The apparatus of claim 18 wherein the protective material comprises felt.

20. The apparatus of claim 18 wherein the platform further comprises a plurality of rollers attached to the platform substantially around the opening of the female die at the upper end of the female die.

21. The apparatus of claim 18 further comprising:
    a bracket having an opening therethrough; and
    a plurality of legs, each leg having an upper end and a lower end with the upper end of each leg being attached to the bracket, each leg being positioned on the bracket to correspond to a panel to be formed in the flower pot or flower pot cover;
    wherein the opening of the bracket is sized and shaped to allow the male die to pass therethrough and the lower ends of the bracket legs cooperate with the top surface of the platform to control the sheet of material disposed between the lower ends of the bracket legs and the top surface of the platform as the sheet of material is pushed by the male die into the opening of the female die.

22. The apparatus of claim 21 further comprising:

means for moving the bracket to a position on the female die wherein each leg releasably engages the sheet of material to fold portions of the sheet of material around the outer edges of the legs as the male die is moved into the female die whereby the legs form a plurality of flattened U-shaped folds in the sheet of material, the forming surfaces of the male die and female die cooperating to form a plurality of flat panels in the flower pot or flower pot cover with each flat panel being disposed between two of the flattened U-shaped folds.

23. The apparatus of claim 22 wherein a protective material is applied to the lower end of the legs to protect the sheet of material from abrasion by the legs.

24. The apparatus of claim 23 wherein the protective material comprises felt.

25. A method of forming a sheet of material into a flower pot or flower pot cover, the steps of the method comprising:

positioning a sheet of material over an opening of a female die, the opening having at least three female forming surfaces for a base and a skirt;

moving a male die into the opening of the female die, the male die having a male forming surface corresponding to each female forming surface and the sheet of material being pressed between the corresponding male and female forming surfaces to form the flower pot or flower pot cover as the male die is moved into the opening of the female die;

producing a vacuum at at least one of the forming surfaces of the female die; and introducing a blast of air into the opening of the female die at each intersection of laterally adjacent female forming surfaces as the male die is moved into the opening of the female die.

26. The method of claim 25 wherein the step of producing a vacuum further comprises:

producing a vacuum at a medial portion of each female forming surface as the male die is moved into the opening of the female die.

27. The method of claim 25 further comprising the step of:

placing a bracket on the sheet of material before the male die is moved into the opening of the female die, the bracket having a plurality of legs, each leg corresponding to a flat panel to be formed;

wherein the bracket legs engage and control the sheet of material as the male die pushes the sheet of material into the opening of the female die.

* * * * *

UNITED STATES PATENT AND TRADEMARK OFFICE
CERTIFICATE OF CORRECTION

PATENT NO. : 5,575,746
DATED : November 19, 1996
INVENTOR(S) : Weder et al.

It is certified that error appears in the above-indentified patent and that said Letters Patent is hereby corrected as shown below:

Column 7, line 49, please delete "144c" and substitute therefor --142c--.

Column 9, line 66, please delete "fo" and substitute therefor --of--.

Signed and Sealed this

Twenty-ninth Day of April, 1997

Attest:

BRUCE LEHMAN

Attesting Officer          Commissioner of Patents and Trademarks